United States Patent [19]

Servos et al.

[11] 3,991,319

[45] Nov. 9, 1976

[54] STANDBY POWER SUPPLY SYSTEM

[75] Inventors: Gerald H. Servos, Glen Ellyn; Martin Kozi, Berwyn, both of Ill.

[73] Assignee: Instrumentation & Control Systems Inc., Addison, Ill.

[22] Filed: Dec. 5, 1975

[21] Appl. No.: 637,881

[52] U.S. Cl. .................................................. 307/64
[51] Int. Cl.² .......................................... H02J 9/00
[58] Field of Search ............. 307/64, 66, 87; 321/4

[56] References Cited
UNITED STATES PATENTS

| | | |
|---|---|---|
| 3,339,082 | 8/1967 | Rhyne, Jr. .............................. 307/66 |
| 3,435,248 | 3/1969 | Geis ...................................... 307/66 |

*Primary Examiner*—Herman Hohauser
*Attorney, Agent, or Firm*—Alter and Weiss

[57] ABSTRACT

A standby power supply system utilized for continuously supplying alternating current power at a regulated value to a load independent of the line power amplitude of continuity. The standby power supply includes an inverter utilizing a direct current source. Direct current feedback circuitry is provided for improving the AC - DC synchronization, minimizing the drain on the source and for holding the direct current relatively constant thereby reducing the requirements of the direct current source.

10 Claims, 1 Drawing Figure

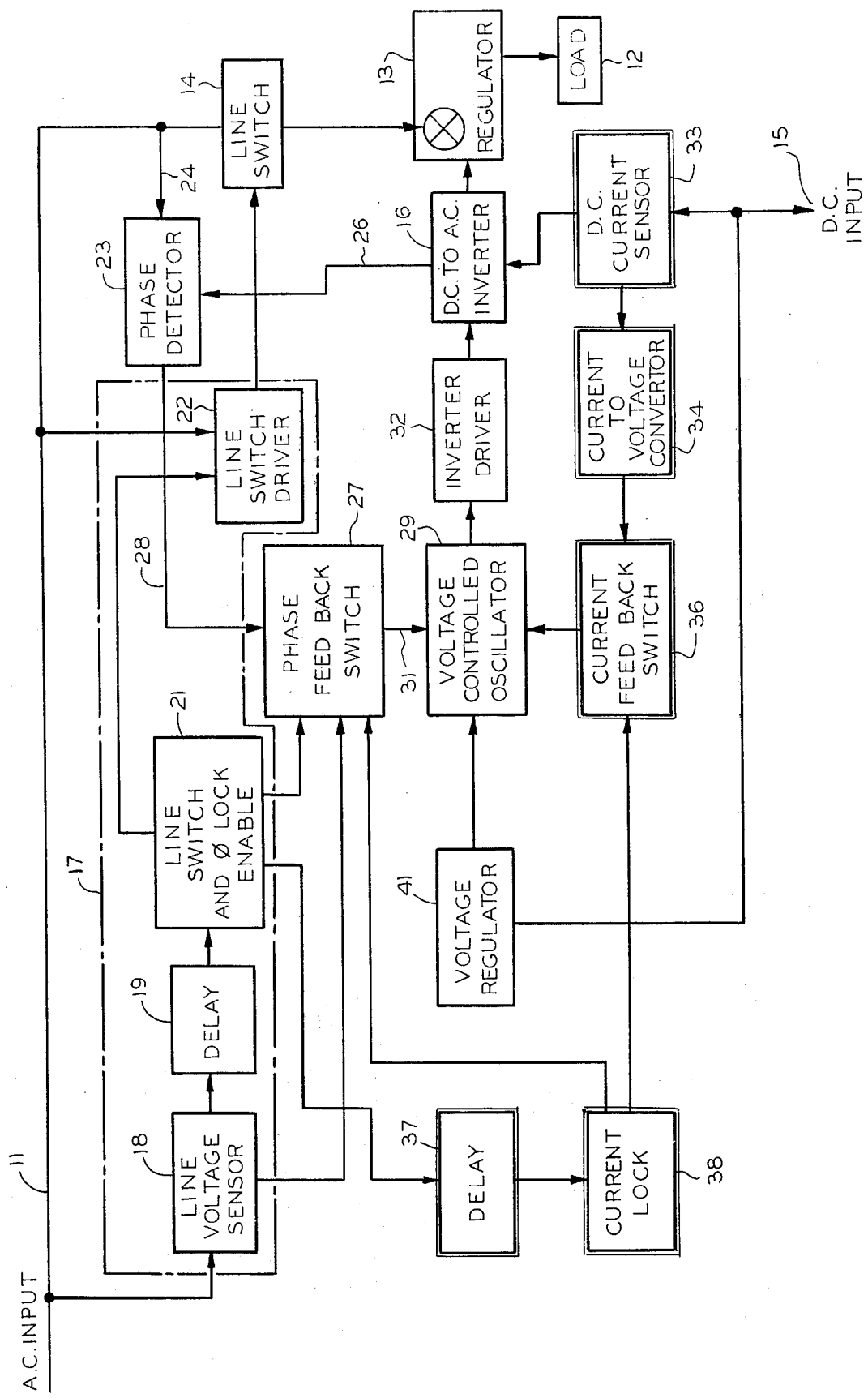

STANDBY POWER SUPPLY SYSTEM

The present invention relates to alternating current power distribution systems, and particularly to improvements in the standby power supply systems wherein the load power is maintained at a desired regulated value regardless of the line fluctuations and even when there is a total failure of the line power supply.

Alternating current power systems having alternate sources of supply are well known. For example, such a power supply has been taught by Schumacher, et al. in U.S. Pat. No. 3,229,111, which issued on Jan. 11, 1966. Essentially, such alternating current standby power supply systems derive power from batteries, when the line current drops below a certain minimum value. The battery power is typically fed to the load through an inverter circuit which generates square wave alternating current of a desired voltage. The square wave current is fed to a circuit which converts the square wave current to sine wave current and regulates the current amplitudes. The regulated sine wave current is connected to the load. An automatic line switch operates to disconnect the line and connect the auxiliary supply, when the line power drops below a certain minimum value.

The inverter power is synchronized to the line power to assure that the output of the inverter and line power are in phase when switching from the inverter to the line and vice versa. This is generally accomplished using a phase lock circuit.

A serious shortcoming in the above described presently available auxiliary or standby power supply systems is caused by the variation in the direct current obtained from the battery while the alternating current is supplied by the line. Direct current is continuously supplied to the inverter. The amount of direct current is a function of the phase difference maintained between the line power and the inverter power. Variations in the phase difference causes variations in the drain on the battery. In presently available systems, the phase is controlled without using the direct current supply relationship between the line signal and the oscillator of the inverter circuit.

Accordingly, it is an object of the present invention to provide a relatively inexpensive, elegant and efficient means for using the D.C. current to control the phase relationship between the line output and the inverter output.

Another and related object of the present invention is to minimize the drain on the battery.

Another related object of the present invention is to reduce the current requirement of the direct current source for the inverter.

Yet another object of the present invention is to provide means for sensing the current received from the direct current source.

Still another and related object of the present invention is to provide a direct current feedback switch operated responsive to the difference between a voltage equivalent of the sensed battery current and the delayed line voltage to thereby provide a current lock in addition to the phase lock presently provided in the prior art standby power supply systems.

In a preferred embodiment of the present invention a direct current feedback loop is added to the inverter circuitry in addition to the phase feedback loop to maintain the direct current input current at a relatively constant value. This increases inverter output regulation, minimizes the direct current drain; thereby reducing the direct current requirements. More particularly, a D.C. current sensor is connected between the D.C. source and the D.C. to A.C. inverter. The sensed D.C. current is converted to voltage and fed through a current feedback switch to the oscillator used with the inverter. The current feedback switch receives a delayed enabling signal from the line through the line switch control circuit which is used to coordinate the line voltage amplitude signal and the D.C. source signal. Further, control of the D.C. signal is obtained through the use of a voltage regulator in transferring the D.C. source signal to the oscillator. The phase locking or synchronizing capabilities of the prior art systems work in conjunction with the modifications described herein.

Other features and objects of the invention and the advantages thereof will be best understood by reference to the following description taken in conjunction with the accompanying drawing, forming a part thereof, which is a block diagram representation of the improved standby power supply system.

The drawing shows in block diagram form both those components of the system which were known in the prior art and the new components (shown by the double line blocks) which vastly improved on the operation of that prior art system. As in the past, line power is provide over the A.C. input, shown as line 11. This line power is connected to a load 12 through a regulator circuit 13.

A line switch 14 is in series between the load regulator circuit 13 coupled to load 12 and the A.C. power input line 11. Also, connected to the regulator circuit 13 is a D.C. to A.C. inverter 16. The D.C. to A.C. inverter 16 provides the alternate power supply, when the A.C. input power fails or diminishes below a certain minimum required value. Normally, the inverter 16 and associated circuit are in the standby condition. It converts to the operating condition when line switch 14 is opened.

Means such as line switch control circuit 17, are provided to determine when the line switch 14 has to be opened to break the connection between the A.C. input and the regulator 13. The control circuit 17 comprises a line voltage sensor 18 which determines the amplitude of the line voltage. When the amplitude is sent through a time delay circuit 19 to a line switch and phase lock enable circuit 21 and a line switch driver 22.

Synchronizing circuitry is provided to assure the phase and amplitude matching of the D.C. to A.C. inverter output and voltage is switched back on, and when the inverter and associated circuitry is switched from the standby mode to the operational mode. The line switch is not reoperated to its normally closed position until the amplitude and phase of the line voltage reach the proper values as determined by the line voltage sensor 18, and until the phase of the output of the D.C. to A.C. inverter 16 is equal to the phase of the voltage on the A.C. input line.

Thus, the synchronizing circuit includes components, such as phase detector 23, which is coupled to the A.C. input line 11 on the input side of the line switch through conductor 24. The phase detector 23 is also coupled to the D.C. to A.C. inverter output 16 to determine its phase, through conductor 26. The phase detector determines the phase difference between the line signal and an inverter signal. The output of circuit 27 acts to cause the phase of the inverter to match the phase of the power line signal. The voltage controlled oscillator 29 is used in conjunction with an inverter drive circuit 32 to operate the D.C. to A.C. inverter, by providing a square wave trigger signal.

In the previously used standby power systems the signal from the inverter was controlled only by the sensed characteristics of the A.C. line. Thus, the inverter phase and amplitude correcting signals came responsive to signals from the circuits, such as the phase detector 23, and a line voltage sensor 18. The inverter circuitry including the oscillator was controlled responsive to the signals from the phase feedback switch 27.

The improvement herein lies in the utilization of the D.C. inverter input current for also controlling the inverter circuitry output; such as, for example, a D.C. current sensor 33. The sensed current is converted to a voltage for operating the voltage controlled oscillator 29 by a current to voltage converter 34, utilizing the signal output of the D.C. current sensor. The voltage output of the current to voltage converter is used to control a current feedback switch 36. The feedback switch 36, either an operational amplifier or a switching element, also receives a signal from the A.C. line 11 through the control circuit 17, delay circuit 37 and a current lock switching device 38 (i.e. reed relay or F.E.T.). Thus, when the voltage sensor 18 provides an output, then the current lock after a delay period provides an enable signal to the feedback switch 36 to lock it in the "on" mode.

The current feedback switch 36 output is coupled into the voltage controlled oscillator 29 to vary the frequency and the phase of the output of the voltage controlled oscillator. The variation of the frequency and phase of the voltage controlled oscillator, controls the D.C. to A.C. inverter so that when the D.C. to A.C. inverter is lagging — pulling more D.C. current — the phase differential is changed by the current feedback to diminish the lag, and therefore, draw less D.C. current. The voltage controlled oscillator 29 receives D.C. power from the source 15 through voltage regulator 41.

In operation, once the inverter is in the operating mode due to a power failure, for example, the line switch 14 is opened and the output regulator 13 is receiving its power from the D.C. to A.C. inverter 16.

At this time the voltage controlled oscillator is free running and not under the control of either the phase feedback switch circuit 27 or the current feedback switch circuit 36, since neither of those circuits are enabled. The square wave output of the oscillator 29 operates the driver 32 to drive the inverter 16 and supply the load. The D.C. current level is a maximum into inverter 16 and there is no D.C. feedback.

When A.C. power starts to return, the line voltage sensor 18 determines the magnitude of the line signal. First, the circuit 21 which is a logic circuit transmitting control signals powers the line switch driver 22 to close the line switch 14. Simultaneously, the phase detector 23 transmits an enabling signal to phase feedback switch 27 to bring the inverter into "soft" synch or lock with the line. The soft synch (at a phase lock) lowers the D.C. current input. After the delay of circuit 37, the current feedback switch 36 is enabled and operates to use the sensed D.C. current to control the inverter output phase. The oscillator frequency is varied to vary the phase by the signal circuit 36. Simultaneously, the current lock 38 sends a signal to phase feedback switch 27 to prevent it from controlling the inverter output phase.

The line voltage in the stabilizer at this time, i.e. when the system is in the standby mode, induces a voltage in the winding of the stabilizer coupled to the inverter that is of the same magnitude and polarity as the output voltage of the inverter. Therefore, the inverter draws current from the D.C. source only as a function of the phase and amplitude difference in the inverter signal and the line signal.

At this time the phase of the inverter has been "hard" locked in the signal from line switch and phase lock enable circuit 21. Similarly, the current lock device signal acts to lock the phase of the inverter to a current lock and maintaining the phase amplitude and frequency of the inverter locked to the A.C. line characteristics.

We claim:
1. An alternating current power distribution circuit, said circuit comprising an output regulator for furnishing alternating current power to a load,
means for connecting a source of alternating current line power to said output regulator,
inverter circuit means for converting direct current power connected at the input of said inverter circuit means to alternating current power at the output of said inverter circuit means,
means for connecting the direct current power to said inverter circuit input,
means for connecting said inverter circuit output to said output regulator,
voltage sensor means for measuring the voltage amplitude of said alternating current line power,
phase detecting means for measuring the phase difference between the alternating current line power and the output of the inverter circuit means,
synchronizing means associated with said inverter circuit means operated responsive to said phase detector means for normally furnishing said alternating current power from said inverter circuit means to said output regulator in lagging phase relationship to said alternating current line whereby the power furnished to said load is normally drawn substantially entirely from said source of alternating current line power,
current sensing means in said means for connecting said direct current source to the input of said inverter circuit means,
means responsive to the amplitude of said line voltage falling below a pre-determined value for disconnecting said alternating current line power output from said regulator, whereby said output regulator obtains the power for the load from said inverter circuit means, and
control means including said current sensing means for controlling the D.C. input to said inverter circuit means by controlling the amplitude and phase of the output of said inverter circuit means.
2. The alternating current power distribution circuit of claim 1 wherein said control means includes direct current feedback means.
3. The alternating current power distribution circuit of claim 1 wherein said inverter circuit means includes voltage controlled oscillator means, and
said control means including means for coupling the output of said current sensing means to control said voltage controlled oscillator means, thereby con- trolling the amplitude and phase of the output of said inverter circuit means.

4. The alternating current power distribution circuit of claim 3 wherein current to voltage converter means are coupled between said current sensing means and said voltage controlled oscillator means, and
  current lock means for controlling the connection of said converter means and said voltage controlled oscillator responsive to the voltage amplitude of said alternating current line.

5. The alternating current distribution circuit of claim 4 wherein current feedback switch means are provided for coupling the output of said current to voltage converter means to said voltage controlled oscillator means,
  said current lock means controlling said switch means responsive to the voltage amplitude of said alternating current line.

6. The alternating current power distribution circuit of claim 5 wherein said direct current sensing means comprises series impedance means in the direct current coupling circuit means,
  means operated responsive to the amplitude of said current in said impedance means for providing a current sensor output,
  said current to voltage converter means comprises operational amplifier means providing a voltage proportional to the output of said current sensing means, and
  said current feedback switch means comprising operational amplifier means operated responsive to the receipt of signals from said current to voltage converter means and from said line voltage sensing means through said current lock means.

7. The alternating current power distribution circuit of claim 6 wherein said direct current input is coupled to said voltage controlled oscillator through a voltage regulator means.

8. The alternating current power distribution circuit of claim 7 wherein said current lock means operates said synchronizing means to the control of the phase of the output of said inverter means out of synchronization with said line signal.

9. An alternating current power distribution circuit, said circuit comprising an output regulator for furnishing alternating current power to a load,
  means for connecting an alternating current line to said output regulator,
  inverter circuit means for converting direct current power to alternating current power,
  means for connecting said alternating current power to said output regulator,
  means for sensing the amplitude of the voltage on said alternating current line,
  means for measuring the phase of the power on said alternating current line,
  synchronizing means associated with said inverter circuit means for normally controlling the phase of said alternating current output from said inverter circuit means to said output regulator in lagging phase relationship to said alternating current line whereby the power furnished to a load connected to the output regulator is drawn substantially entirely from said alternating current line,
  means responsive to a drop in voltage amplitude of said alternating current line below a certain minimum amount for changing the output of said inverter circuit means from a lagging phase relationship to an in phase relationship relative to said line signal, and
  direct current feedback means for controlling the phase and amplitude of said inverter circuit means to control the D.C. current into said inverter circuit means.

10. The alternating current power distribution circuit of claim 9 wherein said current feedback means comprises direct current sensing means for sensing the amplitude of a current flowing from said direct current source to said inverter circuit means,
  voltage converter means for converting the output of said direct current sensor means to a voltage means,
  said inverter circuit means including voltage controlled oscillator means,
  means for connecting said voltage output of said current to voltage converter means to said voltage controlled oscillator means responsive to said line voltage being at least a certain minimum value whereby said inverter circuit means is phase synchronized responsive to the D.C. current into said inverter circuit means.

* * * * *